United States Patent [19]

Yanker

[11] Patent Number: 5,249,263
[45] Date of Patent: Sep. 28, 1993

[54] COLOR PALETTE DISPLAY INTERFACE FOR A COMPUTER-BASED IMAGE EDITOR

[75] Inventor: Peter C. Yanker, Portola Valley, Calif.

[73] Assignee: International Business Machines Corporation, Armonk, N.Y.

[21] Appl. No.: 367,526

[22] Filed: Jun. 16, 1989

[51] Int. Cl.$^5$ .............................................. G06F 5/06
[52] U.S. Cl. .................. 395/131; 395/155; 395/159; 345/150
[58] Field of Search ... 364/521, 518, 522, 200 MS File, 364/900 MS File; 340/747, 750, 798, 799, 706, 703; 395/131, 155, 156, 157, 159

[56] References Cited

U.S. PATENT DOCUMENTS

| | | | |
|---|---|---|---|
| 4,616,220 | 10/1986 | Grunewald et al. | 340/747 |
| 4,857,899 | 8/1989 | Ishii | 340/701 |
| 4,896,291 | 1/1990 | Gest et al. | 364/900 |
| 4,899,136 | 2/1990 | Beard et al. | 340/706 |
| 4,905,164 | 2/1990 | Chandler et al. | 364/518 |
| 4,907,075 | 3/1990 | Braudaway | 358/75 |
| 4,908,610 | 3/1990 | Yamamuro et al. | 340/703 |
| 4,918,626 | 4/1990 | Watkins et al. | 364/522 |
| 4,924,413 | 5/1990 | Suwannukul | 364/521 |
| 4,958,147 | 9/1990 | Kanema et al. | 340/706 |
| 5,060,055 | 10/1991 | Kim | 358/27 |

FOREIGN PATENT DOCUMENTS

| | | |
|---|---|---|
| 0160548 | 11/1985 | European Pat. Off. |
| 0270259 | 6/1988 | European Pat. Off. |
| 0313796 | 5/1989 | European Pat. Off. |

OTHER PUBLICATIONS

"Superpaint . . . the Digital Animator", R. G. Shoup, DATAMATION, vol. 25, No. 5, May 1, 1979, pp. 150-156.

Primary Examiner—Phu K. Nguyen
Attorney, Agent, or Firm—Perman & Green

[57] ABSTRACT

A display system is described for producing and showing color images which includes a screen for displaying an interactive user interface. The display interface includes image color choice areas, anti-alias color choice areas, a current color area, an echo icon area and user-movable cursor indications. The invention enables the display system user to choose among a plurality of displayed colors and to visually determine the effect of the choice. The method includes moving a cursor indication to a color choice area, displaying the color choice in the current color selection area; and displaying in the echo icon area an echo icon drawn using the color choice. This enables the display system user to see an enlarged view of the color choice and an icon drawn with the color and enables the user to assess the effect of the color choice, both from the standpoint of the enlarged view and from the standpoint of exhibiting an expanded anti-aliased figure. In addition, the color alteration also causes the image to be modified to reflect the color change, thus enabling the user to obtain a complete assessment of the results of the color selection.

22 Claims, 7 Drawing Sheets

COLOR HELP

DEFINE COLOR MAP
 GET A PALETTE
 SET DRAW COLOR
 ADOPT PEL COLOR
 MIX COLORS

MIX COLORS

MIX ART OR IMAGE COLOR
 MIX TARGET COLOR
 COPY FROM SELECTED COLOR
 TARGET AGAINST SELECTED COLOR
 NUMERIC COLOR CODE

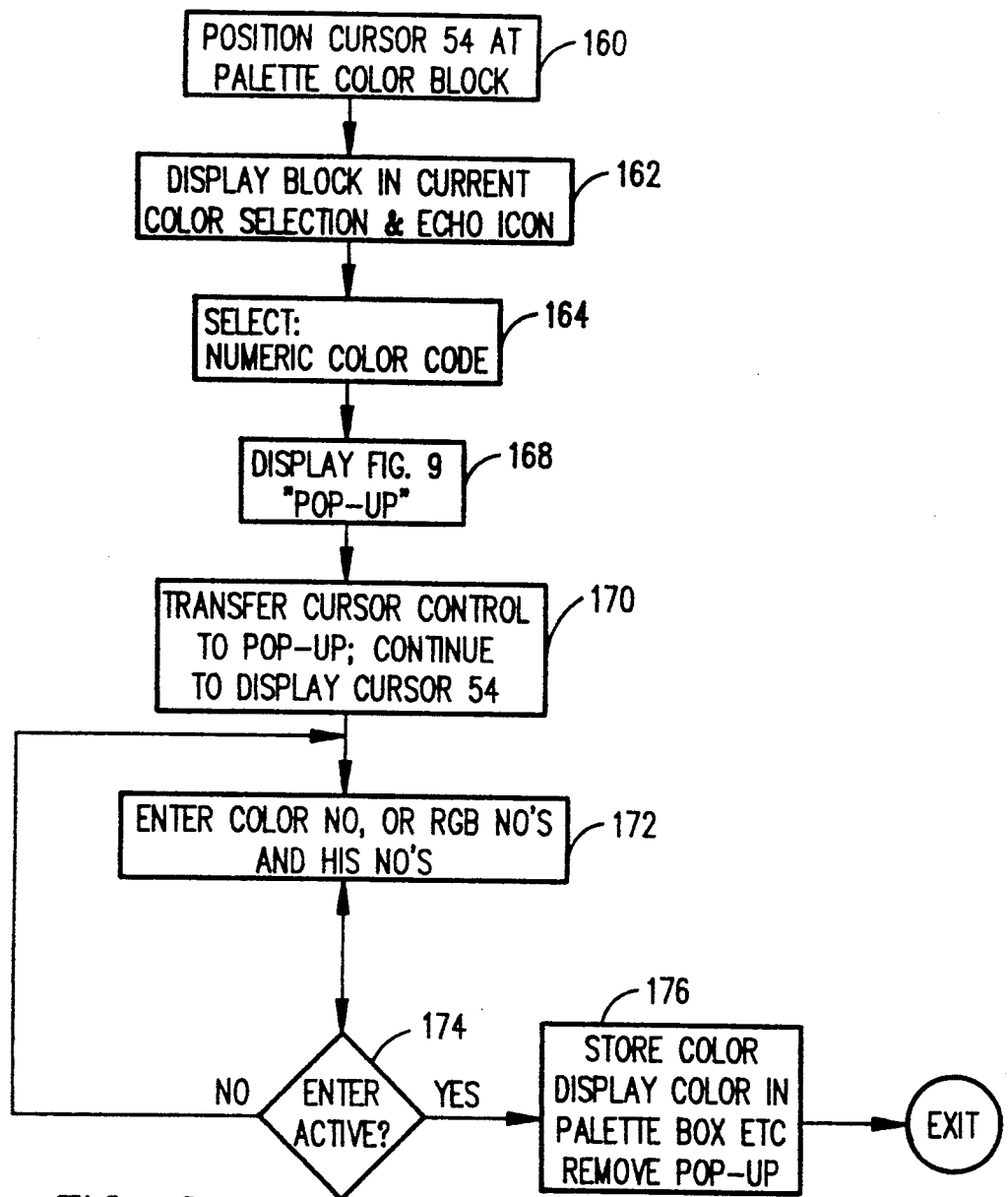

COLOR PALETTE DISPLAY INTERFACE FOR A COMPUTER-BASED IMAGE EDITOR

FIELD OF THE INVENTION

This invention relates to computer-based systems for producing color images and, more particularly, to a color palette display interface for use with such systems.

BACKGROUND OF THE INVENTION

As personal computers (PCs) have improved in processing capability, various application programs have been developed which enable the creation and display of audio-visual presentations. In the mid 1980's, the IBM Corporation marketed a PC application program entitled "PC Storyboard" which enabled the preparation and display of color presentations on an IBM PC. The PC Storyboard software was comprised of four program segments. A first segment, entitled Picture Maker enabled the creation and modification of pictures in medium resolution graphics. Picture Maker included commands to write text, draw figures, generate charts and to cut and paste images between pictures. The second segment, Picture Taker, was employed to capture picture images of screens from other PC application programs. Story Editor was a third segment which enabled the PC user to organize pictures into presentations (stories). It provided for the selection of a variety of picture-to-picture transition methods that allowed one picture to dissolve into another. Variables such as display times, colors and whether the picture would be developed as a full picture or as a series of partial pictures was also enabled by this software. Storyboard also included a segment entitled "Story Tell" which enabled the presentation of stories assembled by the other segments.

PC Storyboard had a limited color choice availability, i.e., a background color and a three-color palette. The background color could be selected from one of sixteen choices. Two choices of color palettes were available, one offering green, red and yellow and the other offering cyan, magenta and white. Each palette was able to be shown in either of two intensities i.e., an intensified "mode" or a "non-intensified mode". In order to provide color variations, other colors were generated by causing picture elements (PELS) to be of alternating colors to provide a visual half-tone effect.

While Storyboard was, for its time, a remarkable product for the PC, it required considerable education of the user before acceptable level presentations could be produced. Additionally, it was somewhat circuitous in its handling of colors other than the primary colors contained within its palette.

Recently, the use of windows, pull downs, cursor selection and other display-oriented, user interface instrumentalities have come into favor. These enable a PC user to directly interface with the PC's software and to control it largely from cursor-controlled screen selections. Substantial capability, color presentation systems, however, have not, to the inventors' knowledge been made available with user-friendly screen interfaces.

Accordingly, it is an object of this invention to provide a color palette display interface for a computer-based image editor that provides a user with complete color selection and edit capability.

It is a further object of this invention to provide a color palette display interface which provides the capability for selecting and altering anti-aliased color combinations.

It is another object of this invention to provide a color palette display interface which enables a user to immediately perceive on a computer screen, the results of a choice of palette color.

SUMMARY OF THE INVENTION

A display system is described for producing and showing color images which includes a screen for displaying an interactive user interface. The display interface includes image color choice areas, anti-alias color choice areas, a current color area, an echo icon area and user-movable cursor indications. The invention enables the display system user to choose among a plurality of displayed colors, and to visually determine the effect of the choice. The method includes moving a cursor indication to a color choice area, displaying the color choice in the current color selection area, and displaying in the echo icon area, an echo icon drawn using the color choice. This enables the display system user to see an enlarged view of the color choice and an icon drawn with the color and enables the user to assess the effect of the color choice, both from the standpoint of the enlarged view and from the standpoint of exhibiting an expanded, anti-aliased figure. In addition, the color alteration also causes the image to be modified to reflect the color change, thus enabling the user to obtain a complete assessment of the results of the color selection.

BRIEF DESCRIPTION OF THE DRAWINGS

FIG. 8 is a high level flow diagram of a "numeric color code" subroutine of the invention.

FIG. 9 is an indication of the pull-down menu which results when the "numeric color code" subroutine operates.

DETAILED DESCRIPTION OF THE INVENTION

Prior to discussing the details of the invention, it is to be understood that it may be configured as either software or firmware, either of which may be adapted to run on a PC, such as the IBM PS/2. As is well known, most modern PCs are constructed to employ a bus structure with PC/subassembly communications taking place, in the main, over the bus or buses. Characteristically, a graphic-capable PC is provided with an arithmetic/logic unit, random access memory, various disk drives for storing quantities of readily available data, and a color display which includes a keyboard. The display is adapted to show an image or images, along with a cursor (or cursors) which enable user selection of various software subroutines. The cursor (or cursors) may be controlled from a keyboard or from another input device, such as a Mouse. All of the aforementioned structure is conventional.

In a preferred embodiment, this invention is configured as a portion of a larger computer program for generating audio/visual presentations. The program includes a plurality of major segments, some of which are a library editor; an image editor; an audio editor; and a story editor. The library editor manages the retrieval, processing and storage of audio-visual objects (i.e., pictures, narrations, music). The audio editor is used to record (digitize) sound and to edit it. The image editor, of which this invention is a portion, is primarily used to add text and create graphics and images for the audio-visual presentation. As part of the image editor, each image is provided with a palette which enables the user to select a complete range of colors for any portion of the displayed image, as well as to enable selection and modification of a number of anti-aliased color combinations. The audio-visual results from the library editor, image editor and audio editor are organized by a story editor segment which then enables the entire story to be run so that a user can view it as a whole.

Figure 1:
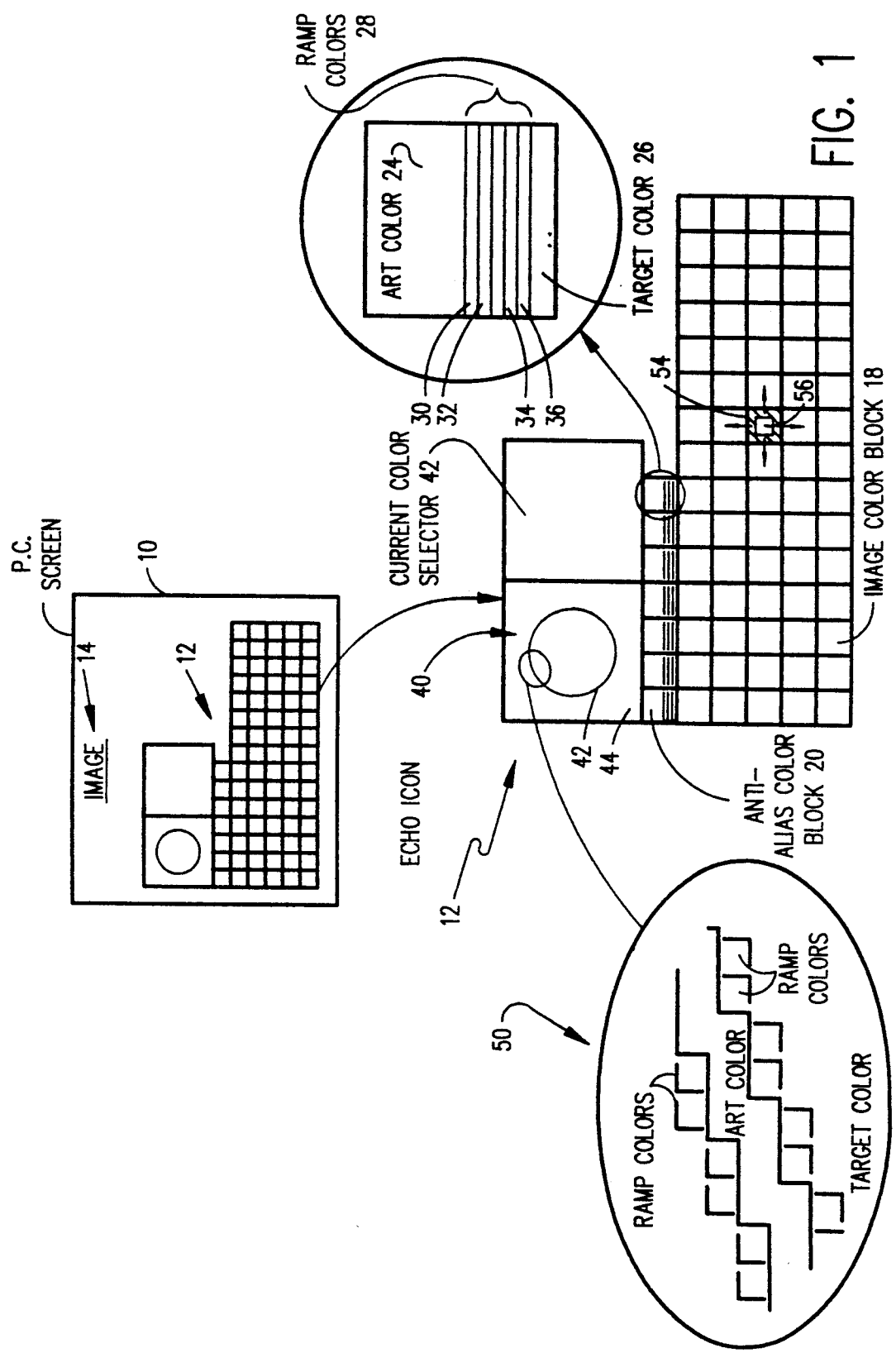
FIG. 1 is a showing of a PC screen with a color palette display interface embodying the invention.

Referring to FIG. 1, the image editor portion of the above program enables an image to be accessed from the Program library and displayed on a PC screen 10. When the user selects a pull-down menu which indicates one or more "Color Help" routines, such as that shown in FIG. 2, a color palette display 12 appears in the lower portion of screen 10. It overlays image 14 on the screen and enables the image to be edited for color. Color palette 12 defines a number of color characteristics for the image, such as anti-alias ramps and the total number of available colors. The invention enables a palette's individual colors to be altered, including "custom colors" (colors which typically come from a digitized image) and "art colors" (colors associated with anti-aliased text and drawings). For any selected color, the user may vary its hue, intensity and/or saturation to achieve the color blend desired.

Color palette 12 is shown in expanded form in the bottommost area of FIG. 1 to enable its various component parts to be better visualized. In the lower portion of the palette are a plurality of image color blocks 18, each block showing a single color. Each image color block 18 may be preset to display a specific color or, in the alternative, the block may display one of the various colors contained within image 14 on screen 10. As will be hereinafter understood, any color in an image color block 18 may be selected for use in image 14; may be replaced with another color; or, may be altered as to its hue, intensity, or saturation.

Palette 12 further contains a more limited group of blocks 20 devoted to showing colors used with anti-aliased character presentations in image 14. In FIG. 1, there are shown seven anti-aliased color blocks 20. As shown in expanded area 22, each anti-aliased color block 20 includes an art color portion 24, a target color portion 26 and a plurality of rows of ramp colors 28 which vary between art color 24 and target color 26. For instance, ramp color rows 30 and 32 contain a majority of art color 24 and a minority of target color 26; whereas, ramp color rows 34 and 36 contain a majority of target color 26 and a minority of art color 24.

Art color 24 is generally the color which is utilized for the internal portions of alpha-numeric characters and other line type features in image area 14. Target color 26 is generally the background color over which the alpha-numeric and/or other image feature is superimposed.

Referring back to color palette 12, several expanded areas are provided to enable the user to view the results of a color selection and/or alteration. Echo icon area 40 includes an echo icon 42 which, in FIG. 1 is shown as a circle. It should be understood that other icons, such as an ellipse or other curved image, may be used so long as a portion thereof can illustrate the effects of choices of anti-aliased colors. A portion of icon 42 has been expanded and is shown within balloon 50. Area 44 in echo icon area 40 is a background color. If an anti-aliased color block 20 has been selected, background area 44 will assume the target color displayed within the selected color block 20, and echo icon 42 will assume the displayed art color.

As is known, anti-aliasing enables curved and slanted lines to be displayed without the stairstep image common when square-pel images are employed. Anti-aliasing techniques essentially "fill-in" the stairstep areas with shaded inserts which ramp from the inner-most image color to the background color, thereby giving the illusion of a smooth line. This is accomplished in icon 42 by causing the innermost portion of the line to assume the art color, whereas the stairstep portions are filled in with lesser brightness ramp colors, ramping towards the background target color.

Color palette 12 is also provided with an enlarged current color selection area 42 which displays, the currently selected image color block or anti-aliased color block.

One cursor employed with color palette 12 is cursor 54 which is "hollow" and enables the color in either the image color block 18 or the anti-alias color block 20 to be viewed through its transparent center area 56. A highlighted portion about its periphery enables cursor 54 to be easily tracked as it is moved throughout any of color blocks 18 or 20 by user inputs through a keyboard associated with the PC (not shown). Cursor 54 may be moved to any of anti-alias color blocks 20 or image color blocks 18, depending upon the user's actuation of the keyboard cursor control mechanism.

As will be understood from the flow diagrams which further describe this invention, each time cursor 54 is moved to an image color block 18 or an anti-alias color block 20, an expanded image of that block appears in current color selection block 42. If cursor 54 is in place in over an image color block 18, echo icon 42 and assumes the color displayed by the color block and the background area 44 color is black. If, cursor 54 is moved to an anti-alias color block 20, echo icon 42 assumes the art color in the anti-aliased color block and the background color becomes the target color illustrated in the block. Echo icon 42 is, furthermore, anti-aliased using the ramp colors contained within the anti-alias color block 20.

As can be seen, by simply moving cursor 54 about blocks 18 or 20, a selected color can be viewed in an expanded area and also its effect on curved and slanted images can be seen. Finally, as will be fully understood, through the use of various sub routines, any color in an image block 18 or an anti-aliased color block 20 can be altered to any other color and, anti-aliased in the process, assuming that an anti-alias color block 20 has been chosen. Furthermore, as any color is chosen, assuming it is present in image 14 on PC screen 10, that color changes in accordance with the users alteration of the palette color.

Figures 2, 3, 4:
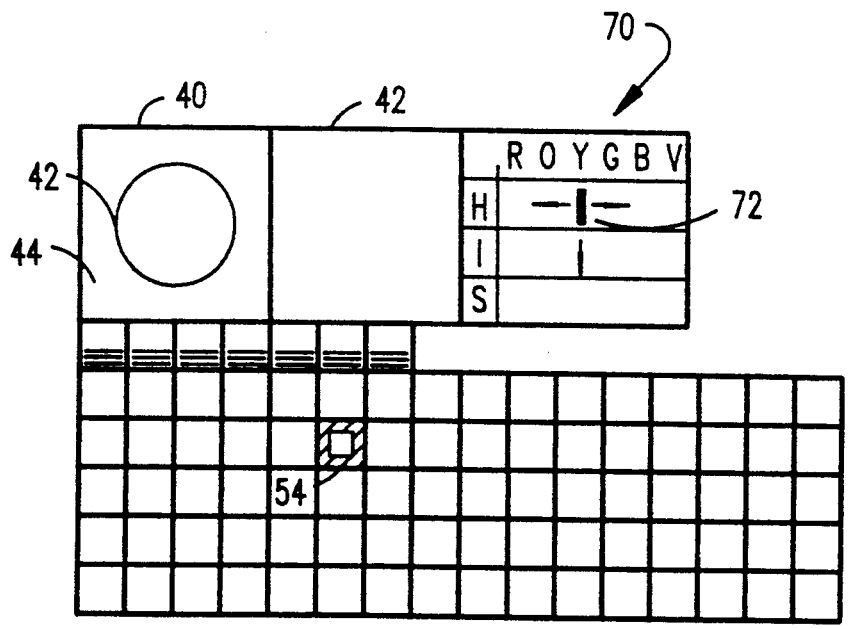
FIG. 2 illustrates a pull-down menu of various color helps available.
FIG. 3 is a pull down menu illustrating various "mix color" subroutines available during the operation of the invention.
FIG. 4 indicates a modification to the color palette display interface which occurs when certain "mix color" subroutines are performed.

Turning now to FIG. 2, a plurality of pull-down menus are employed to enable the user to select a particular color alteration subroutine. The menus shown in FIG. 2 and FIG. 3 are displayed in an upper area of PC screen 10 in the known manner. For instance, if the user is in the image edit portion of the audio visual program, an action bar (not shown) is imposed across the upper portion of PC screen 10 which contains a number of indications, one of which is "color help." Upon placing a highlighted cursor over "color help", the pull down menu shown in FIG. 2 appears. Certain of those menu items enable the accessing of a palette, the definition of a color map, establishment of a draw color or pel color, and access to subroutines which enable colors to be mixed or altered. Placing a cursor next to successive menu lines in FIG. 2, enables the following defined functions to be accomplished:

Define color map—specifies the number of art and custom colors to assign to the current palette and defines how many ramp "levels of color" to use for anti-aliasing of art colors. It also specifies whether the image colors are to be "custom" (uniquely set according to image content) or "standard" (a standard set of colors apply to the image).

Get a palette—this allows a palette to be selected to replace the one currently associated with the image in process.

Set draw color—this displays the color table for the current palette. Cursor movement is used to select a color to become assigned as the current draw color. When an art color is selected and in effect, drawing is done with anti-aliasing. When an image color is selected, drawing is done without anti-aliasing.

Adopt pel color—this causes the current draw color to be set to whatever color is under the current position of the cursor. It sets to an art color when the cursor is on an art color; and sets to an image color otherwise.

Mix colors—this allows the mixing of individual palette colors through adjustment of a colors hue, intensity and saturation level. In addition, the target color to which an art color will be ramped is set in this subroutine. Color changes entered by the user are immediately applied to the current image.

The detailed operation of the invention will be explained with respect to the mix color line of the color help menu.

If a cursor is placed so that it highlights the mix color line in the color help menu, followed by a depression of an enter key, the mix color menu shown in FIG. 3 appears in image area 14 of PC screen 10. Assuming that the "mix art or image color" line is highlighted by the initial highlight cursor when the mix color menu appears, the color palette shown in FIG. 1 is altered, as shown in FIG. 4, by the addition of a mix screen 70. Across the top of mix screen 70, is plotted ROYGBV, representing the initials of the major colors of the spectrum (i.e., Red, Orange, Yellow, Green, Blue, Violet). Down the left side of mix screen 70 are three rows, one each for hue, intensity and saturation. A cursor 72 may be moved horizontally along any of the rows or vertically between the rows when a "mix" subroutine is in effect. When mix screen 70 is shown, the position of cursor 54 is fixed at its position in the palette. Under the circumstances shown in FIG. 4, the color shown at cursor position 54 is illustrated in the current color selection block 42, with echo icon 42 exhibiting the same color. The background color 44 is black.

As cursor 72 is moved by the user along the hue line in mix screen 70, the color visible through cursor 54, in current color selection box 42 and in echo icon 42 all change identically to reflect the changed color components indicated by the position of cursor 72. When cursor 72 is subsequently moved down to the intensity line and moved either right or left, the intensity of the aforementioned colors all change simultaneously. When cursor 72 is moved down to the saturation line, the level of color saturation in each of the aforementioned areas varies identically. In addition, assuming that the color viewed through cursor 54 is present in the image on PC screen 10 (FIG. 1), then that color changes identically with the aforementioned color indications.

Turning now to FIGS. 5a, 5b, 6, 7, and 8, high level flow diagrams are illustrated which describe, in further detail, the logical operations within the PC which enable the above mentioned color actions to occur.

Figure 5A:
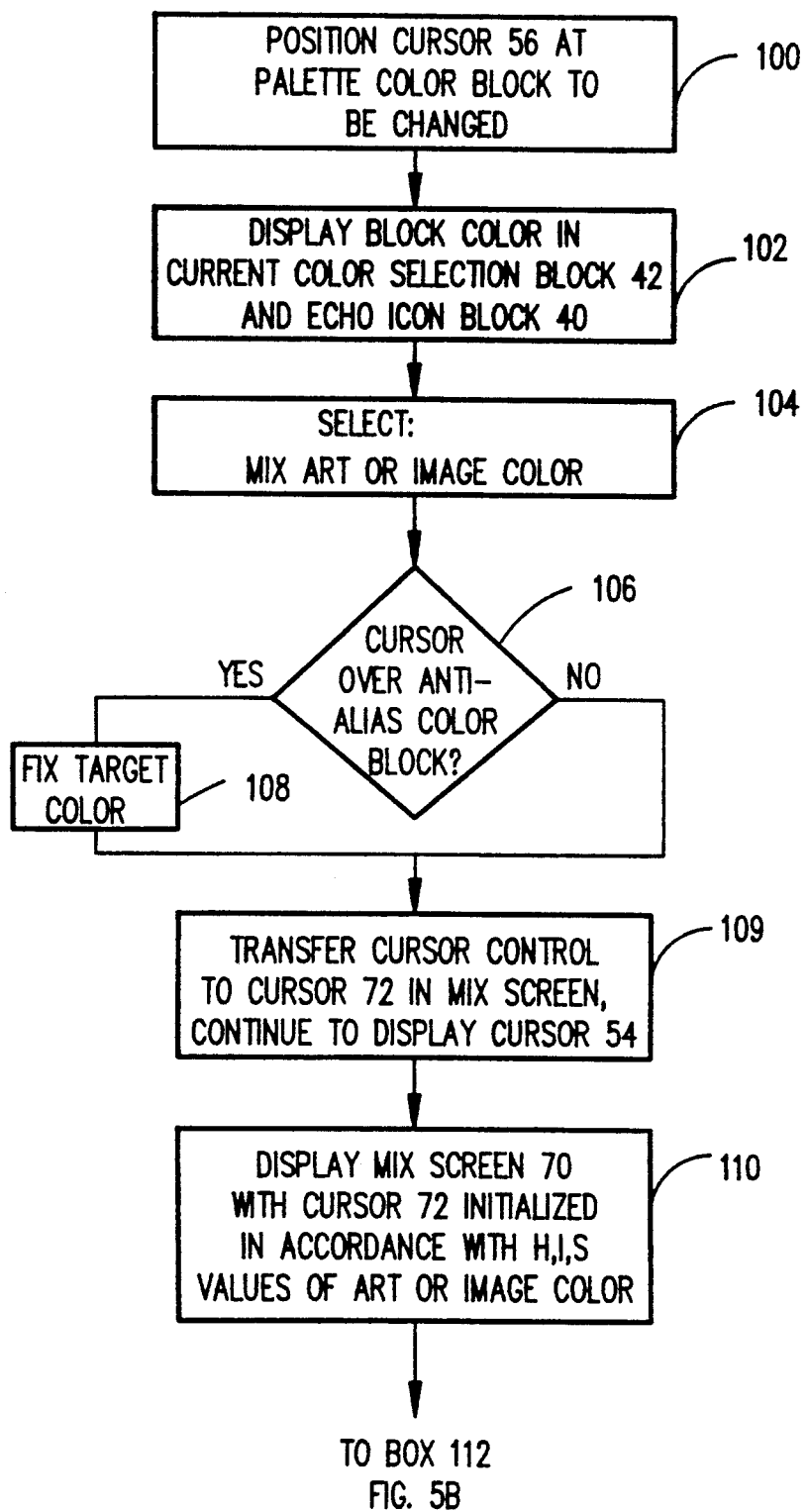
FIGS. 5a and 5b are high level flow diagrams of a "mix art or image color" subroutine of the invention.
Figure 5B:
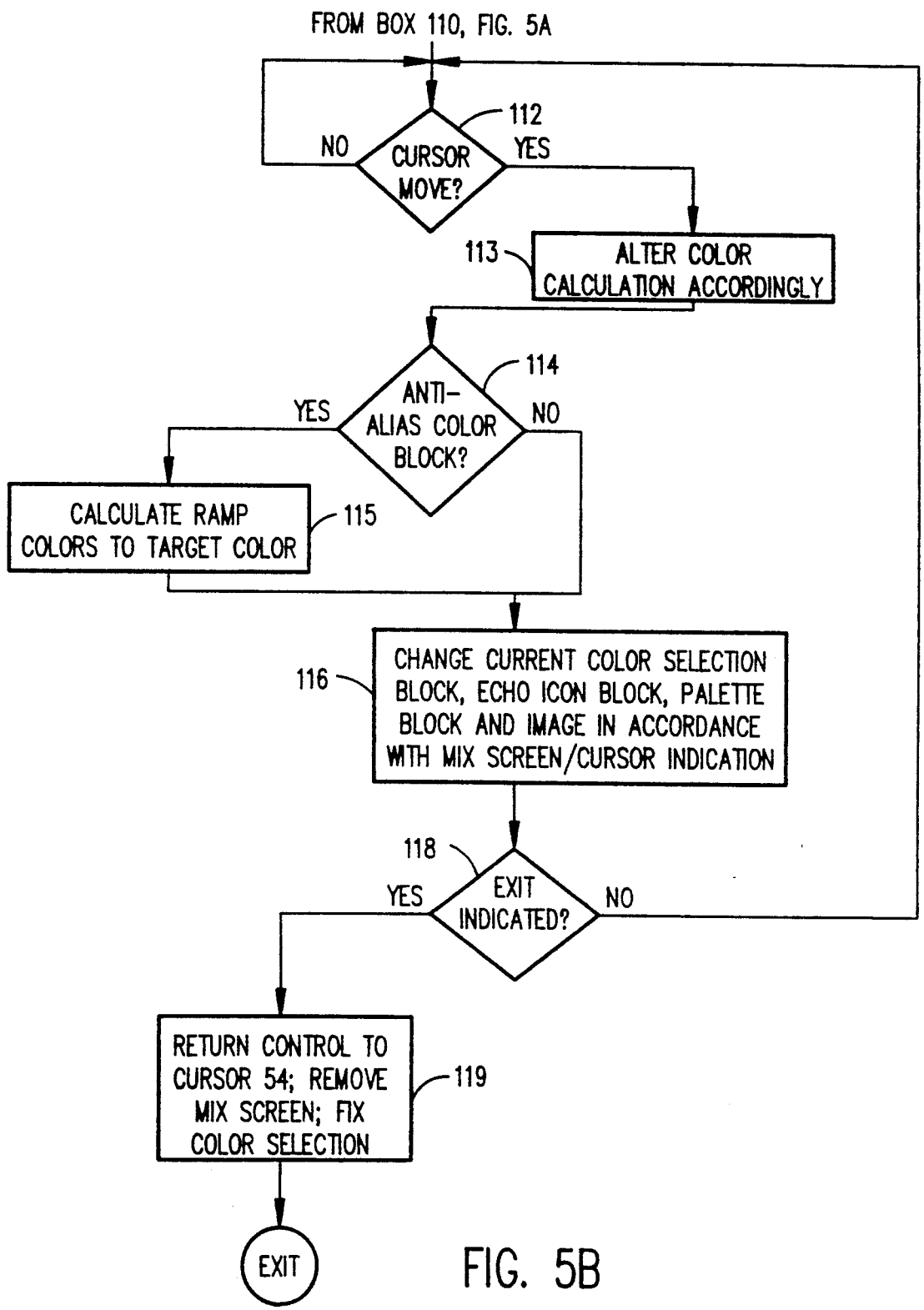

In FIGS. 5a and 5b, the routine required to mix either the art or the image color is illustrated. The process commences by the user positioning cursor 54 over a palette color block whose color is to be changed or altered (box 100). In response, the system displays the block's color in current color selection block 42 and echo icon block 40. (box 102). Then, the user selects from the menu of FIG. 3 the "mix art or image color" line (box 104) which enables the color alteration routine to be enabled.

The system next determines whether cursor 54 is over an anti-alias color block or not (box 106). If the answer is yes, recall that only the art or image color is to be altered in this subroutine. Thus, it will be the art color to be altered, and it is then necessary to fix the target color so that it cannot be changed (box 108). If the cursor is not over an anti-alias color block, then, by inference, it is over an image color block (containing only a single color).

The system continues to display cursor 54 at its present location, (box 109), and transfers cursor control to a cursor 72 in the mix screen 70 (FIG. 4)—which is now displayed (box 110). Additionally, cursor 72 has its positions on the hue, intensity and saturation lines initialized to represent those values evidenced by the art or image color being operated upon.

At this stage, the system commences testing the position of cursor 72 to determine if it has moved or not (box 112). If no movement is sensed, the test merely recycles. If movement is sensed, the system determines whether cursor 72 has had its line position changed or has been moved within a line. If it has been moved within the hue line, a recalculation occurs of a new color hue in accordance with the new cursor position. If, on the other hand, cursor 72 has been moved to a new line, a similar calculation occurs. These details have been omitted from the flow diagram of FIG. 5a to avoid unnecessary complication.

Once the color calculations are completed, the system proceeds to determine whether cursor 54 is over an anti-alias block (box 114), and if yes, the program calculates ramp colors between the newly calculated art color and the pre-existing target color. When the calculations are completed, the program displays the new color(s) in current color selection block 42, echo icon block 40, the palette block where cursor 54 is positioned, and in the image (box 116). Thus, the user is able to view, in a number of ways, the effect of the color alteration created by the change of position of cursor 72 in mix screen 70. For instance, assuming an anti-alias color block is being altered, that color block is reproduced in current color selection block 42 showing the new art color and a group of ramp color rows to the preexisting target color. In addition, echo icon 42 has its art color inner portion changed to coincide with the newly chosen art color and each of the ramp colors is evidenced in the anti-aliased portion of the icon. If the user is dissatisfied with the results of the color change, cursor 72 may be moved again and the process repeats itself as shown. If the user is satisfied, the program is exited (decision box 118). Control returns to cursor 54, mix screen 70 removed, and the color selection indicated by cursor 72 is fixed in the indicated image color block or anti-alias color block (box 119).

Returning to FIG. 3, if the user selects the "mix target color" line from the menu, the procedure followed by the system is much the same as for the "mix art or image color" subroutine. In this instance, however (see FIG. 5a) in lieu of the target color being fixed (box 108), the art color is fixed and the target color subsequently altered. Accordingly, the flow diagram for this subroutine is similar to that shown in FIGS. 5a and 5b except that it is the target color which is altered through the operation of cursor 72 within mix screen 70. In summary, both the "mix art or image color" and "mix target color" lines from the menu of FIG. 3 accomplish the alteration of the hue, intensity or saturation of the respective color being displayed and indicate the effect of the color change to the user.

Figure 6:
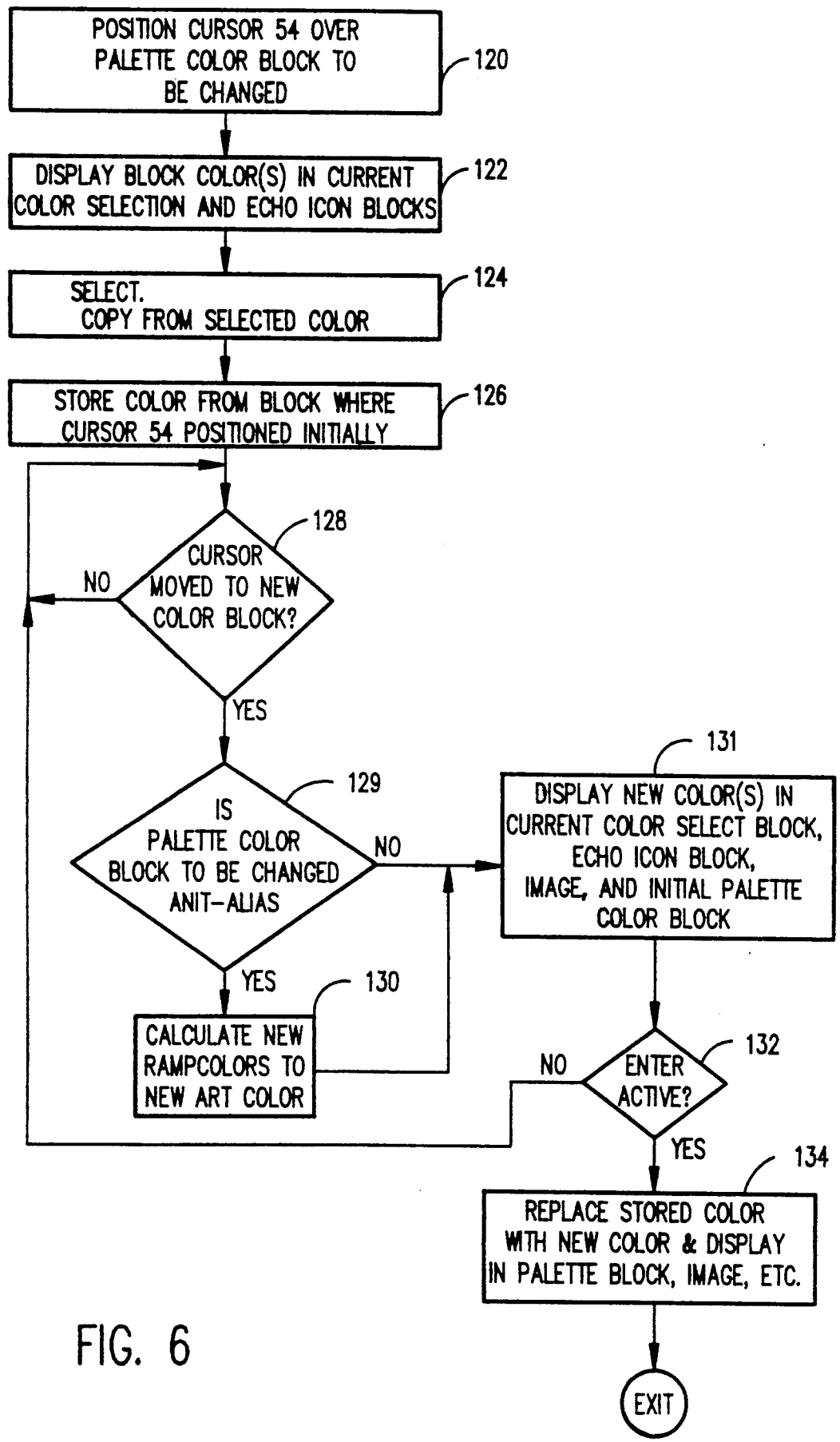
FIG. 6 is a high level flow diagram of a "mix target color" subroutine of the invention.

Turning now to FIG. 6, the "copy from selected color" subroutine will be as described. The program commences much the same as in the previous routines, in that cursor 54 is positioned over a selected color block and the selected color is displayed in current color selection block 42 and echo icon block 40 (boxes 120, 122). The user then moves a highlight cursor over the "copy from selected color" line in the menu of FIG. 3, and enables commencement of the subroutine. Initially, the system stores the color from the color block where cursor 54 is positioned (box 126). If cursor 54 is positioned over an anti-alias block, it is the art color which is stored. Then a test is performed (box 128) to determine whether the user has moved cursor 54 to a new color block. If not, the routine recycles. If it is determined that cursor 54 has been moved to a new color block, the new color block is displayed in current color selection block 42, echo icon block 40, in the palette color block where cursor 54 was initially positioned and in the image shown on PC screen 10 (box 131). Additionally, if it is determined (box 129) that the palette color block being changed is an anti-alias color block, new ramp colors are calculated to the new art color (box 130) and the results displayed as indicated in box 131. It is to be noted that in this subroutine, cursor 54 is not fixed and is employed by the user to move around the palette to enable the new color selection to occur. Furthermore, as cursor 54 is moved around the palette, each new color is displayed in the image at the precise location where the color which was stored (box 126) is shown in the image.

Once the user has arrived at an acceptable color, an enter key on the PC is depressed (box 132) indicating that the new color (or colors, if the block is an anti-alias block) is to be stored in the initial palette color block, displayed in the image, etc. (box 134). If, on the other hand, the cursor is again moved, the program recycles.

Figure 7:
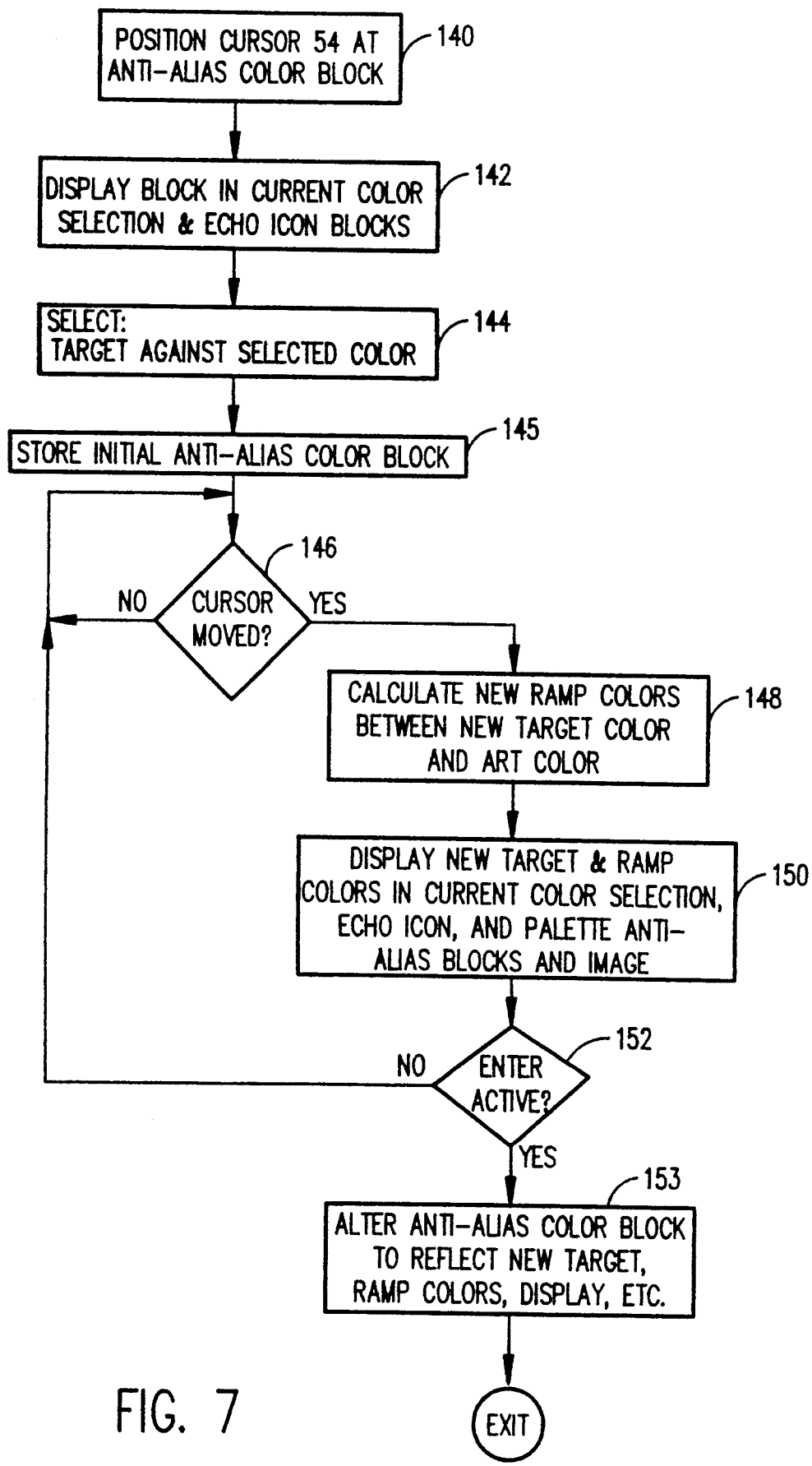
FIG. 7 is a high level flow "diagram" of a "target against selected color" subroutine of the invention.

Referring now to FIG. 7, a subroutine is illustrated for changing a target color in an anti-alias palette block to another displayed palette color. Initially, the user positions cursor 54 at an anti-alias color block (box 140). The system responds by displaying, in the aforedescribed manner, a replica of the anti-alias color block in current color selection block 42 and echo icon block 40 (box 142). The user then places a highlight cursor over the "target against selected color" (box 144) which enables implementation of a target color alteration subroutine. If cursor 54 is not positioned over an anti-alias color block, a note is displayed to the user indicating such.

The subroutine tests whether cursor 54 has been moved to a new color block. Recall, that the objective of this subroutine is to change a target color from its present color to another displayed palette color. Thus cursor 54 is enabled to wander around the palette, with its successive positions being displayed as aforestated. The position of cursor 54 is continuously tested to determine if it has moved (box 146) and, if no movement is sensed, the testing continues. On the other hand, if it has moved to a new palette block, new ramp colors are calculated to the preexisting art color (box 148). Then, current color selection block 42, echo icon block 40, the initial anti-alias color block and image are all simultaneously altered to show the new target and ramp colors to the preexisting art color (box 150). If the enter key is activated (box 152) the new target and ramp colors replace the target and ramp colors in the stored initial anti-alias color block and the program exits (box 153). If enter is not activated, the program recycles back to box 146, until the user makes a color choice.

If, now the user selects "numeric color code" from the menu of FIG. 3, the subroutine shown in FIG. 8 occurs as does the "pop-up" shown in FIG. 9. Initially, the user positions cursor 54 at a palette color block (box 160). As aforestated, this causes the color in the block to be displayed in the current color selection block 42 and echo icon block 40 (box 162). If the user then selects "numeric color code" (box 164), the FIG. 9 pop-up (box 168) is displayed above the color palette, superimposed over the image on PC screen 10. The pop-up enables the user to enter either a color number; individual red, green, and/or blue numbers; and/or individual hue, intensity, and saturation numbers. As the numbers are entered, the display shows the color which corresponds to the entered numbers, in the echo icon and current color selection blocks 40 and 42 and the palette color block where cursor 54 is positioned. In addition, the image is similarly modified Returning to FIG. 8, once the pop-up of FIG. 9 occurs, the cursor control is transferred to a pop-up cursor highlight and cursor 54 continues to be displayed, but cannot be moved until the user exits from the subroutine. Then, the user either enters a preexisting color number; or individual red, green, and blue numbers and/or hue, intensity and saturation numbers. When all numbers are entered on the screen, the "enter" key is depressed, and the display then indicates the corresponding color in the aforestated positions (boxes 172, 174 and 176). In specific, the user has found that the selected color is acceptable and has depressed the enter key which has caused the selected color to be stored; displayed in the palette box and elsewhere as aforestated. The FIG. 9 pop-up is removed. At this point the program exits. If, however, before depressing "enter", the user decides that the color is not appropriate, new numbers may be entered and the program recycles as shown.

It should be understood that the foregoing description is only illustrative of the invention. Various alternatives and modifications can be devised by those skilled in the art without departing from the invention. Accordingly the present invention is intended to embrace all sorts of alternative modifications and variances which fall within the scope of the independent claim.

I claim:

1. In a display system for producing and showing color images, means for displaying an interactive user interface which includes image color choice areas, anti-alias color choice areas, a current color selection area, an echo icon area and movable cursor indications, a method for enabling the display system user to choose from among a plurality of colors and to visually determine the affect of said choice, said method comprising:
   (a) moving a cursor indication to a color choice area;
   (b) displaying the color shown in said color choice area in said current color selection area; and
   (c) displaying an echo icon comprising a line image superimposed over a background color in said echo icon area, the color of said line image being said color choice, whereby an enlarged view of the color choice and a line image drawn with said color choice on said background color are displayed to enable the user to assess the color choice.

2. The method as defined in claim 1 wherein said line image includes at least a portion comprising a curved line, said curved line having interior portions sandwiched between peripheral portions.

3. The method as defined in claim 2 wherein each said anti-alias color choice area includes an art color and a target color and a region containing a plurality of color bands, each color band exhibiting a different color, color bands positionally closer to said art color having said art color as a predominant component, and color bands positionally closer to said target color having said target color as a predominant component.

4. The method as defined in claim 3 wherein said displaying step (c) further comprises:
   (d) employing said target color as said background color for said line image when said cursor is positioned at an anti-alias color choice area.

5. The method as defined in claim 4, wherein each said anti alias color choice area includes a plurality of ramp color bar areas, each said bar area being a mixture of said art color and said target color, the ramp color bar area adjacent to said art color including more of said art color than said target color and the ramp color bar adjacent to said target color including more of said target color than said art color.

6. The method as defined in claim 5, wherein said employing step (d) further comprises:
   (e) coloring interior portions of said curved line with said art color and coloring increasingly peripheral portions of said curved line with colors exhibited by said ramp color bar areas.

7. The method as defined in claim 6 wherein said display system, prior to said moving step (a), performs the step of:
   (f) creating a cursor indication for a color choice area, said cursor indication provided with an outline which surrounds said color choice area and includes a transparent interior, thus enabling said color to be viewed in said cursor indication's interior.

8. The method as defined in claim 1 further comprising the step of:
   (g) altering a color in one of said color choice areas from a first color to a second color.

9. The method as defined in claim 8 further comprising the steps of:
   (h) superimposing said interactive user interface over a displayed image; and
   (i) changing every point in said displayed image which reflects said first color to said second color in response to said altering step (g).

10. The method as defined in claim 1 wherein said icon illustrates said visual feature as an enlarged view.

11. In a display system for producing and showing color images, an interactive user interface comprising a plurality of image color choice areas and anti-alias color choice areas and first and second cursors, a method for enabling a user to alter a color in any of said areas, comprising the steps of:
    (a) moving said first cursor to position said first cursor at an initial one of said color choice areas;
    (b) indicating to said display system, a mix color command;
    (c) displaying a mix screen and said second cursor, said mix screen indicating hue, intensity and saturation variables; and
    (d) responding to user movements of said second cursor among said mix screen variables to accordingly alter the color in said initial color choice area.

12. The method as defined in claim 11 wherein said display system displays an image in addition to said interface, further comprising the step of:
    (e) altering every point in said displayed image which reflects the color in said initial color choice area to conform it to the altered color resulting from step (d).

13. The method as defined in claim 11 wherein said initial color choice area is an anti-alias color choice area which includes an art color, a target color and a plurality of interposed color bars indicating various mixtures of said target and art colors, said mix color command (b) acting to alter said art color, said responding step (d) comprising the further steps of:
    (f) altering the art color in said anti-alias color choice area, but not said target color; and
    (g) revising said interposed color bars by substituting said altered art color therein in place of the initial art color.

14. The method as defined in claim 13 wherein said display system displays an image in addition to said interface, further comprising the step of:
    (h) altering every point in said displayed image which reflects a color in said initial anti-alias color choice area, to conform it to the altered color resulting from steps (f) and (g).

15. The method as defined in claim 11 wherein said initial color choice area is an anti-alias color choice area which includes an art color, a target color and a plurality of interposed color bars indicating various mixtures of said target and art colors, said mix color command (b) acting to alter said target color, said responding step (d) comprising the further steps of:
    (i) altering the target color in said anti-alias color choice area, but not said art color; and
    (j) revising said interposed color bars by substituting said altered target color therein in place of the initial target color.

16. The method as defined in claim 15 wherein said display system displays an image in addition to said interface, further comprising the step of:

(k) altering every point in said displayed image which reflects a color in said initial anti-alias color choice area, to conform it to the altered color resulting from steps (i) and (j).

17. In a display system for producing and showing color images, an interactive user interface comprising a plurality of image color choice areas and anti-alias color choice areas and a cursor, a method for enabling a user to alter a color in any of said areas, comprising the steps of:

(a) moving said cursor to position said cursor at an initial one of said color choice areas;

(b) indicating to said display screen, a mix color command which enables said initial color choice area color to be changed to a color exhibited by another color choice area;

(c) moving said cursor to said another color choice area;

(d) displaying in said initial color choice area said another color; and (e) selecting said another color to fix said another color in said initial color choice area.

18. The method as defined in claim 17 wherein said display system displays an image in addition to said interface, further comprising the step of:

(f) altering every point in said displayed image which reflects the color in said initial color choice area, to conform it to the selected color resulting from step (e).

19. The method as defined in claim 18 wherein said initial color choice area is an anti-alias color choice area which includes an art color, a target color and a plurality of interposed color bars indicating various mixtures of said target and art colors, said mix color command (b) acting to replace said target color, said displaying step (d) comprising the further steps of:

(g) changing the target color in said anti-alias color choice area to said another color choice, but not said art color; and (h) revising said interposed color bars by substituting said changed target color therein in place of the initial target color.

20. The method as defined in claim 18 wherein said initial color choice area is an anti-alias color choice area which includes an art color, a target color and a plurality of interposed color bars indicating various mixtures of said target and art colors, said mix color command (b) acting to replace said art color, said displaying step (d) comprising the further steps of:

(i) changing the art color in said anti-alias color choice area, but not said target color; and (j) revising said interposed color bars by substituting said changed art color therein in place of the initial art color.

21. In a display system for producing and showing color images, an interactive user interface comprising a plurality of image color choice areas and anti-alias color choice areas and first and second movable cursors, a method for enabling a user to alter a color in any of said areas, comprising the steps of:

(a) moving said first cursor to position said first cursor at an initial one of said color choice areas;

(b) indicating to said display system a mix color command, to invoke a numeric color code entry chart;

(c) displaying said numeric color code entry chart and said second cursor within said chart, said chart indicating entries for color numbers, and hue, intensity and saturation variables;

(d) responding to user movements of said second cursor and numeric entries to said chart to accordingly alter the color in said initial color choice area.

22. In a display system for producing and showing images which include visual features, means for displaying an interactive user interface which includes visual feature choice areas, an icon area and movable cursor indications, a method for enabling the display system user to choose from among a plurality of visual feature choice areas and to visually determine the affect of said choice on an image, said method comprising;

(a) moving a cursor indication to a selected visual feature choice area;

(b) displaying a selected visual feature choice that is displayed in said visual feature choice area in a current visual feature selection area; and (c) displaying an icon in said icon area, said icon including a line drawing and said visual feature choice, whereby a view of said selected visual feature choice and said icon illustrating said visual feature choice are displayed to enable the user to assess said visual feature choice selection.

* * * * *